(12) United States Patent
Fujita et al.

(10) Patent No.: US 7,781,934 B2
(45) Date of Patent: Aug. 24, 2010

(54) ALTERNATING-CURRENT DYNAMO-ELECTRIC MACHINE

(75) Inventors: Masahiko Fujita, Tokyo (JP); Toshiyuki Yoshizawa, Tokyo (JP); Haruyuki Kometani, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 12/176,128

(22) Filed: Jul. 18, 2008

(65) Prior Publication Data
US 2009/0009025 A1    Jan. 8, 2009

Related U.S. Application Data

(62) Division of application No. 11/449,653, filed on Jun. 9, 2006, now Pat. No. 7,420,314.

(30) Foreign Application Priority Data
Jun. 24, 2005    (JP)    ............... 2005-184779

(51) Int. Cl.
*H02K 1/28* (2006.01)
*H02K 19/16* (2006.01)
(52) U.S. Cl. ...................................... 310/263
(58) Field of Classification Search ............ 310/263
See application file for complete search history.

(56) References Cited

U.S. PATENT DOCUMENTS

| | | | |
|---|---|---|---|
| 4,959,577 A * | 9/1990 | Radomski ................... | 310/263 |
| 5,543,676 A | 8/1996 | York et al. | |
| 6,201,335 B1 | 3/2001 | Higashino et al. | |
| 6,225,727 B1 | 5/2001 | Oohashi et al. | |
| 6,369,486 B1 * | 4/2002 | Armiroli et al. ............. | 310/263 |
| 6,815,864 B2 | 11/2004 | Tanaka et al. | |
| 6,894,414 B1 | 5/2005 | Asao et al. | |
| 6,930,432 B2 | 8/2005 | Maeda et al. | |
| 7,009,324 B2 * | 3/2006 | Maeda et al. ............... | 310/263 |
| 7,057,327 B2 | 6/2006 | Kanazawa et al. | |
| 7,095,192 B1 | 8/2006 | Fujita et al. | |

(Continued)

FOREIGN PATENT DOCUMENTS

DE    19802784    7/1999

(Continued)

*Primary Examiner*—Burton Mullins
(74) *Attorney, Agent, or Firm*—Sughrue Mion, PLLC (57) ABSTRACT

An alternating-current dynamoelectric machine according to the present invention includes: a stator including: a stator core in which slots that extend in an axial direction are formed on an inner side; and a stator winding that is mounted to the stator core by winding conducting wires into the slots; and a rotatable rotor including: a field winding that is disposed inside the stator; a rotor core constituted by a first pole core and a second pole core that each have claw-shaped magnetic poles that are disposed so as to cover the field winding and that alternately intermesh with each other; and first and second permanent magnets that are respectively disposed on two facing side surfaces of adjacent claw-shaped magnetic poles and that have magnetic fields that are oriented so as to reduce leakage of magnetic flux between the claw-shaped magnetic poles, and a magnetic body is disposed between a pair of the first and second permanent magnets.

7 Claims, 9 Drawing Sheets

U.S. PATENT DOCUMENTS

| | | |
|---|---|---|
| 2002/0117934 A1 | 8/2002 | Kanazawa et al. |
| 2005/0110358 A1 | 5/2005 | Maeda et al. |
| 2005/0156479 A1 | 7/2005 | Fujita et al. |
| 2005/0184617 A1 | 8/2005 | Fujita et al. |
| 2005/0236927 A1 | 10/2005 | Maeda et al. |
| 2006/0097605 A1 | 5/2006 | Maeda et al. |

FOREIGN PATENT DOCUMENTS

| | | |
|---|---|---|
| JP | 5-056616 A | 3/1993 |
| JP | 2000-331821 A | 11/2000 |
| JP | 2000-341918 A | 12/2000 |
| JP | 3-1445667 B2 | 1/2001 |
| JP | 2001-078374 A | 3/2001 |
| JP | 2005-160172 A | 6/2005 |

\* cited by examiner

ALTERNATING-CURRENT DYNAMO-ELECTRIC MACHINE

BACKGROUND OF THE INVENTION

1. Field of the Invention

The present invention relates to an alternating-current dynamoelectric machine that has a rotor in which permanent magnets are disposed between adjacent claw-shaped magnetic poles.

2. Description of the Related Art

Conventional automotive alternating-current generator-motors are known that have a rotor in which permanent magnets are disposed between adjacent claw-shaped magnetic poles (see Patent Literature 1, for example).

In such cases, magnetic leakage flux between those claw-shaped magnetic poles is reduced, or magnetic saturation by the main field magnetic flux is alleviated, by the permanent magnets being magnetized in a direction opposite to the magnetic leakage flux between the claw-shaped magnetic poles, enabling power generation and torque output to be improved by making the magnetic flux interact with the stator core to increase the effective magnetic flux that contributes to power generation or torque generation.

Patent Literature 1

Japanese Patent No. 3144567 (Gazette: FIG. 2)

PROBLEM TO BE SOLVED BY THE INVENTION

Improving generated torque in automotive alternating-current generator-motors is a problem, and in automotive generator-motors aimed at functioning to stop idling in particular, it is necessary to increase generated torque for engine starting, i.e., electric motor starting torque.

It is also necessary to increase power generation output due to recent increases in on-board electrical equipment.

For those purposes, the quantity of generated torque and generated power can be improved by increasing the volume of permanent magnets that are used (magnet volume).

However, there have been problems such as that increasing the volume of expensive permanent magnets leads to increases in manufacturing costs, and there is also a risk that the permanent magnets may be dislodged by centrifugal force during high-speed rotation, etc.

SUMMARY OF THE INVENTION

The present invention aims to solve the above problems and an object of the present invention is to provide an alternating-current dynamoelectric machine that enables output to be improved without increasing permanent magnet volume.

In order to achieve the above object, according to one aspect of the present invention, there is provided an alternating-current dynamoelectric machine including: a stator including: a stator core in which slots that extend in an axial direction are formed on an inner side; and a stator winding that is mounted to the stator core by winding conducting wires into the slots; and a rotatable rotor including: a field winding that is disposed inside the stator; a rotor core constituted by a first pole core and a second pole core that each have claw-shaped magnetic poles that are disposed so as to cover the field winding and that alternately intermesh with each other; and first and second permanent magnets that are respectively disposed on two facing side surfaces of adjacent claw-shaped magnetic poles and that have magnetic fields that are oriented so as to reduce leakage of magnetic flux between the claw-shaped magnetic poles, the alternating-current dynamoelectric machine being characterized in that a magnetic body is disposed between a pair of the first and second permanent magnets.

According to another aspect of the present invention, there is provided an alternating-current dynamoelectric machine including: a stator including: a stator core in which slots that extend in an axial direction are formed on an inner side; and a stator winding that is mounted to the stator core by winding conducting wires into the slots; and a rotatable rotor including: a field winding that is disposed inside the stator; a rotor core constituted by a first pole core and a second pole core that each have claw-shaped magnetic poles that are disposed so as to cover the field winding and that alternately intermesh with each other; and a permanent magnet that is disposed between two facing side surfaces of adjacent claw-shaped magnetic poles and that has a magnetic field that is oriented so as to reduce leakage of magnetic flux between the claw-shaped magnetic poles, the alternating-current dynamoelectric machine being characterized in that first and second magnetic bodies are respectively disposed on first and second circumferential side surfaces of the permanent magnet.

According to yet another aspect of the present invention, there is provided an alternating-current dynamoelectric machine including: a stator including: a stator core in which slots that extend in an axial direction are formed on an inner side; and a stator winding that is mounted to the stator core by winding conducting wires into the slots; and a rotatable rotor including: a field winding that is disposed inside the stator; a rotor core constituted by a first pole core and a second pole core that each have claw-shaped magnetic poles that are disposed so as to cover the field winding and that alternately intermesh with each other; and a permanent magnet that is disposed between facing first and second side surfaces of adjacent claw-shaped magnetic poles and that has a magnetic field that is oriented so as to reduce leakage of magnetic flux between the claw-shaped magnetic poles, the alternating-current dynamoelectric machine being characterized in that the permanent magnet is disposed on the first side surface and a magnetic body is disposed on the second side surface.

According to yet another aspect of the present invention, there is provided an alternating-current dynamoelectric machine including: a stator including: a stator core in which slots that extend in an axial direction are formed on an inner side; and a stator winding that is mounted to the stator core by winding conducting wires into the slots; and a rotatable rotor including: a field winding that is disposed inside the stator; a rotor core constituted by a first pole core and a second pole core that each have claw-shaped magnetic poles that are disposed so as to cover the field winding and that alternately intermesh with each other; and permanent magnets that are respectively disposed on two facing side surfaces of adjacent claw-shaped magnetic poles and that have magnetic fields that are oriented so as to reduce leakage of magnetic flux between the claw-shaped magnetic poles, the alternating-current dynamoelectric machine being characterized in that permanent magnets that are disposed on first and second circumferential sides of a claw-shaped magnetic pole are held by a holding member that has an angular C-shaped cross section that also surrounds the claw-shaped magnetic pole and has a magnetic body.

Using an alternating-current dynamoelectric machine according to the present invention, output can be improved without increasing permanent magnet volume.

DETAILED DESCRIPTION OF THE PREFERRED EMBODIMENTS

Preferred embodiments of the present invention will now be explained based on the drawings, and identical or corresponding members and portions in the drawings will be given identical numbering.

Moreover, in each of the embodiments, an automotive alternating-current generator-motor will be explained as an example of an alternating-current dynamoelectric machine.

Embodiment 1

Figure 1:
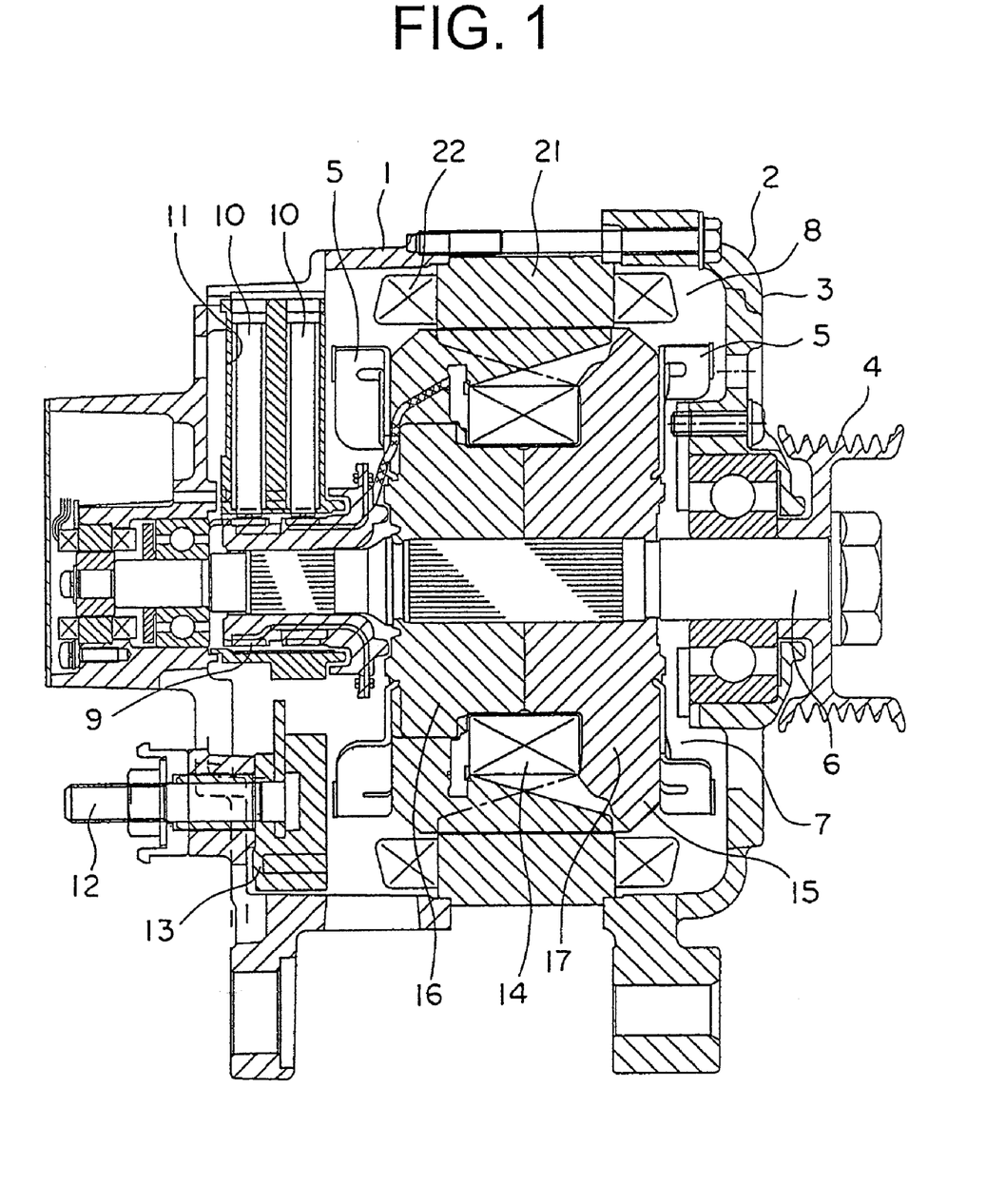
FIG. 1 is a cross section showing an automotive alternating-current generator-motor according to Embodiment 1 of the present invention.
Figure 2:
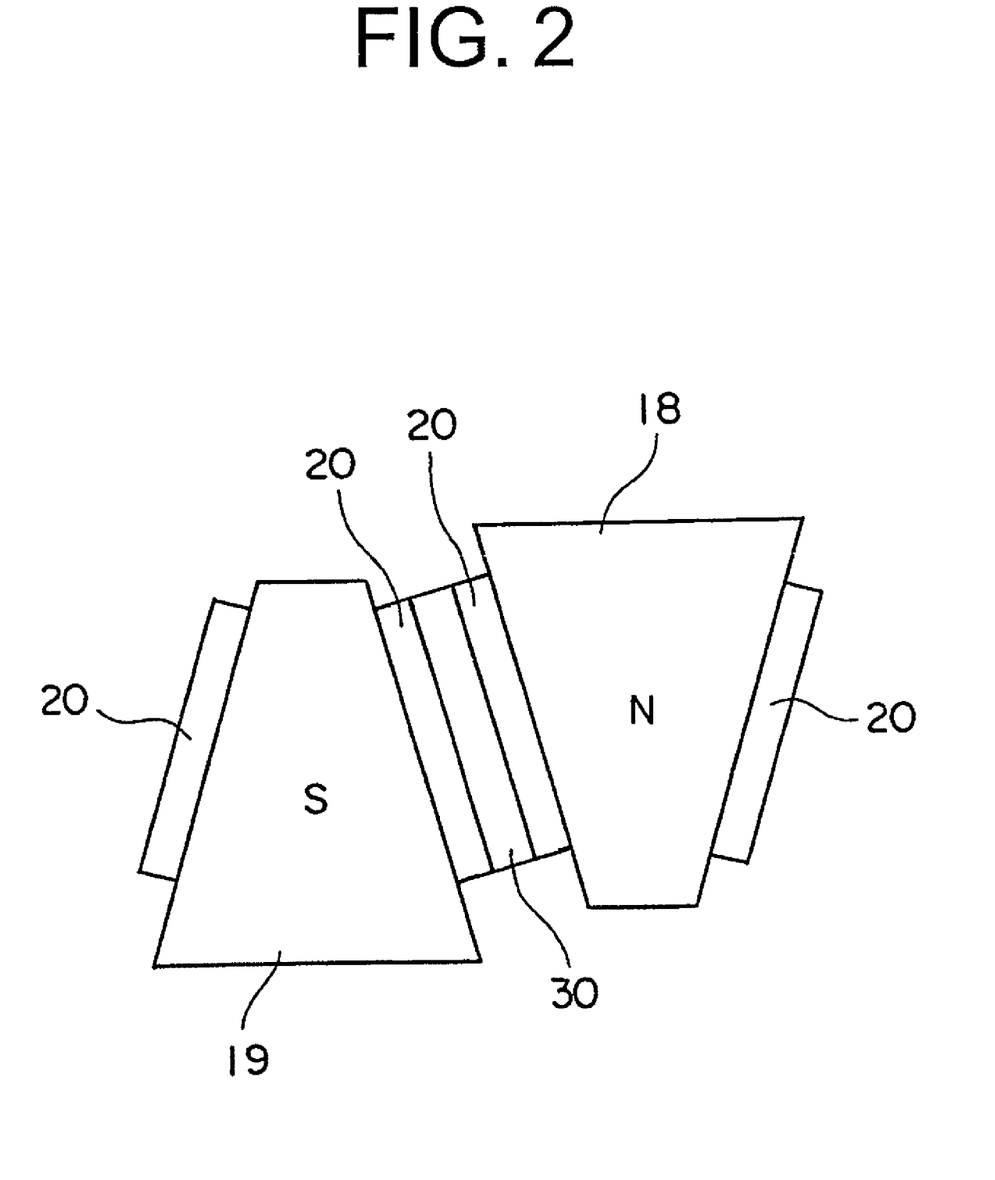
FIG. 2 is a diagram showing part of the generator-motor from FIG. 1 when viewed from a radial direction.

FIG. 1 is a cross section showing an automotive alternating-current generator-motor according to Embodiment 1 of the present invention, and FIG. 2 is a diagram showing part of FIG. 1 when viewed from a radial direction.

In this automotive alternating-current generator-motor (hereinafter "generator-motor"), which constitutes a dynamoelectric machine, a shaft 6 that has a pulley 4 fixed to a first end portion is rotatably disposed inside a case 3 that is constituted by a front bracket 1 and a rear bracket 2 that are made of aluminum. A Lundell rotor 7 is fixed to the shaft 6. Fans 5 are fixed to two end surfaces of the rotor 7.

A stator 8 is fixed to an inner wall surface of the case 3. Slip rings 9 that supply electric current to the rotor 7 are fixed to a second end portion of the shaft 6. A pair of brushes 10 that are housed in a brush holder 11 slide on surfaces of the slip rings 9. Terminals 12 that are connected to a circuit board 13 and that can also be connected to an inverter circuit (not shown) are disposed on the front bracket 1.

The rotor 7 includes: a field winding 14 that generates a magnetic flux on passage of an electric current; and a rotor core 15 that is disposed so as to cover the field winding 14 and in which magnetic poles are formed by the magnetic flux. The rotor core 15 is constituted by a first pole core 16 and a second pole core 17 that are alternately intermeshed with each other. The first pole core 16 and the second pole core 17 are made of iron and have respective claw-shaped magnetic poles 18 and 19.

The rotor 7 also includes: permanent magnets 20 that are bonded to each of two facing side surfaces of the adjacent claw-shaped magnetic poles 18 and 19 and that have magnetic fields that are oriented so as to reduce leakage of the magnetic flux between claw-shaped magnetic poles 18 and 19; and magnetic bodies 30 that are disposed between pairs of the permanent magnets 20.

The stator 8 includes: a stator core 21; and a stator winding 22 constituted by conducting wires that are wound into this stator core 21 such that an alternating current is generated by changes in the magnetic flux from the field winding 14 accompanying rotation of the rotor 7.

Next, operation when a generator-motor having the above construction is used as a generator will be explained.

An electric current is supplied from a battery (not shown) through the brushes 10 and the slip rings 9 to the field winding 14, generating a magnetic flux and magnetizing the claw-shaped magnetic poles 18 of the first pole core 16 into North-seeking (N) poles and the claw-shaped magnetic poles 19 of the second pole core 17 into South-seeking (S) poles. At the same time, since the pulley 4 is driven by an engine and the rotor 7 is rotated by the shaft 6, a rotating magnetic field is applied to the stator winding 22, giving rise to an electromotive force. This alternating electromotive force passes through a rectifier (not shown) and is converted into direct current, its magnitude is adjusted by a regulator (not shown), and the battery is recharged.

Next, operation when a generator-motor having the above construction is used as an electric motor will be explained.

During starting of the engine, an alternating current is supplied to the stator winding 22. A field current is also supplied through the brushes 10 and the slip rings 9 to the field winding 14, generating a magnetic flux and magnetizing the claw-shaped magnetic poles 18 of the first pole core 16 into North-seeking (N) poles and the claw-shaped magnetic poles 19 of the second pole core 17 into South-seeking (S) poles. The stator winding 22 and the rotor 7 act as electromagnets, rotating the rotor 7 inside the stator 8 together with the shaft 6. Torque from the shaft 6 is transmitted to an output shaft of the engine by means of the pulley 4, starting the engine.

Now, the present inventors have found torque increase due to the mounting of magnetic bodies between the claw-shaped magnetic poles by three-dimensional electromagnetic field analysis.

Figure 3:
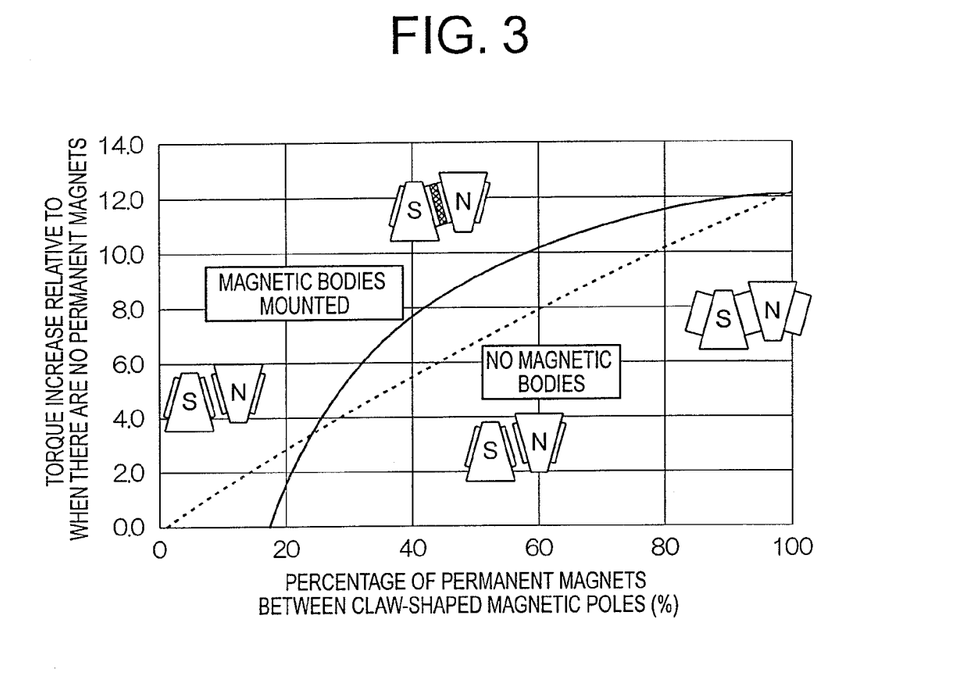
FIG. 3 is a characteristics graph showing relationships between permanent magnet percentage between claw-shaped magnetic poles and torque increase.
Figure 4:
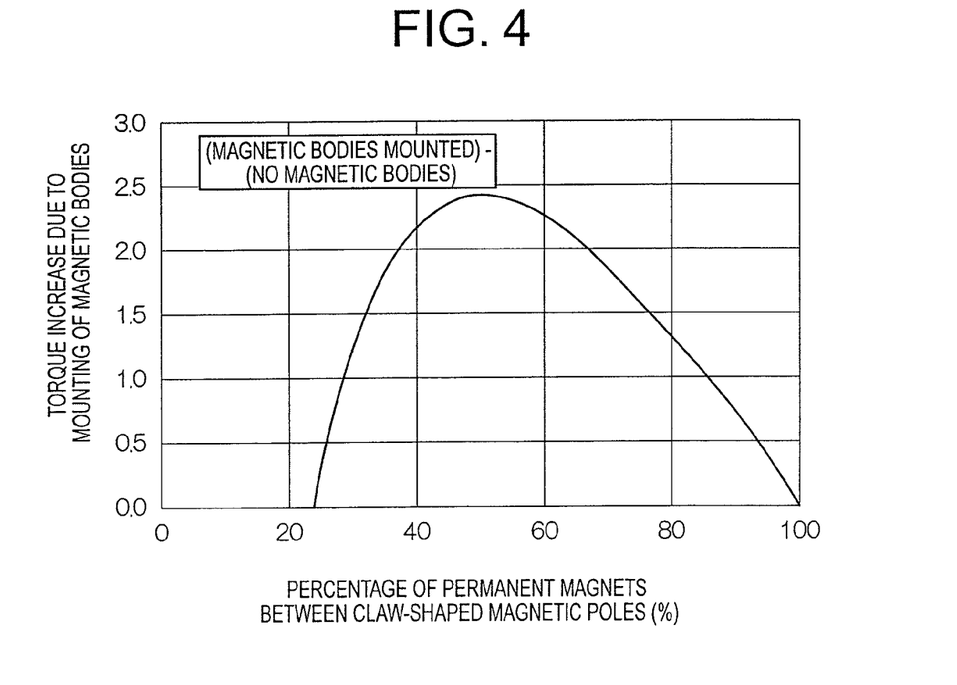
FIG. 4 is a characteristics graph showing a relationship between permanent magnet percentage between claw-shaped magnetic poles and torque increase.

FIGS. 3 and 4 are graphs showing those results.

In FIG. 3, the horizontal axis represents the percentage of space occupied by the permanent magnets that are disposed between the adjacent claw-shaped magnetic poles, "0%", for example, being when there are no permanent magnets, and "100%" being when the space between the claw-shaped magnetic poles is occupied by the permanent magnets and there are no magnetic bodies.

The vertical axis represents the torque increase (%) compared to when there are no permanent magnets.

In the graph, the broken line represents the torque increase when the magnetic bodies are "absent", and the solid line represents the torque increase when the magnetic bodies are "present".

From the graph, it can be seen that torque value increases in proportion to increase in the percentage of space that is occupied by the permanent magnets between the claw-shaped magnetic poles, and in addition, torque value increases further by mounting the magnetic bodies.

FIG. 4 is a graph showing the difference between the torque value when there are magnetic bodies and the torque value when there are none. In FIG. 4, the horizontal axis is similar to the horizontal axis in FIG. 3 and represents the percentage of space occupied by the permanent magnets that are disposed between the adjacent claw-shaped magnetic poles, and the vertical axis is the difference between the torque value when the magnetic bodies are "present" and the torque value when "absent" and shows torque increase (%) when the magnetic bodies are "present".

From the graphs, it can be seen that torque is increased by the magnetic bodies when the percentage of space that is occupied by the permanent magnets between the claw-shaped magnetic poles is from 25 percent to less than 100 percent, and is at a maximum when the percentage of space that is occupied by the permanent magnets and the magnetic bodies between the claw-shaped magnetic poles is 50 percent each.

Moreover, in FIGS. 3 and 4, the torque is the starting torque in a state in which the field current is being passed, and it is assumed that the maximum electric current that can be passed for a short period of time is being passed as the field current. It is also assumed that the short-term maximum electric current value is passed as the armature current, and the starting torque is set such that a phase angle formed by the field magnetomotive force and the armature magnetomotive force is a phase angle generating maximum torque. However, since there is a limit to the power supply voltage from the battery, the maximum torque must be within this voltage limit.

Thus, using a generator-motor according to Embodiment 1, the magnetic flux of the permanent magnets 20 is strengthened by disposing the magnetic bodies 30 between the permanent magnets 20 that face each other, and when used as an electric motor, the generated torque can be improved while keeping the overall volume of the permanent magnets 20 constant, as can also be seen from the three-dimensional electromagnetic field analysis by the present inventors.

When used as a generator, generated power can be improved.

In particular, generated torque and generated power are maximized when the percentage of space that is occupied by the permanent magnets 20 and the magnetic bodies 30 between the claw-shaped magnetic poles 18 and 19 is 50 percent each.

Embodiment 2

Figure 5:
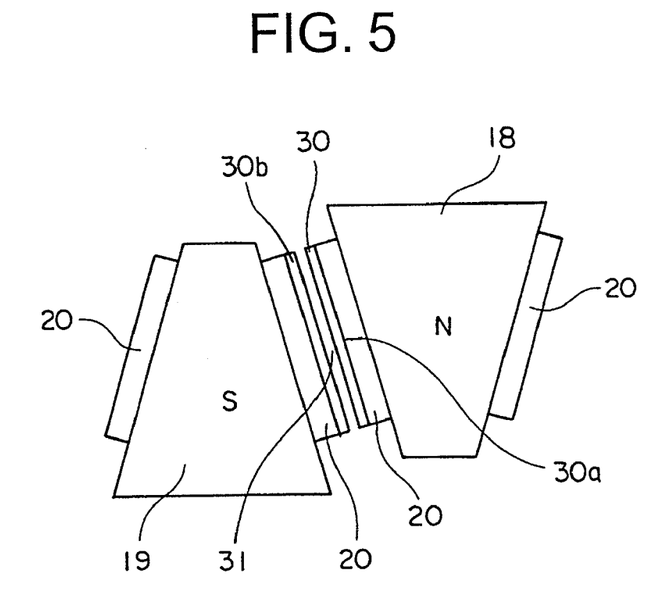
FIG. 5 is a diagram showing part of an automotive alternating-current generator-motor according to Embodiment 2 of the present invention when viewed from a radial direction.

FIG. 5 is a diagram showing part of a generator-motor according to Embodiment 2 of the present invention when viewed from a radial direction, wherein magnetic bodies 30 are divided into two sections constituted by a first magnetic body portion 30a and a second magnetic body portion 30b by means of a gap 31 that extends parallel to a side surface.

The rest of the configuration is similar to the generator-motor according to Embodiment 1.

In this embodiment, the magnetic flux of the permanent magnets 20 is strengthened by disposing the magnetic bodies 30 between the permanent magnets 20 that face each other, enabling the generated torque to be improved.

Because the gaps 31 are disposed on the magnetic bodies 30, a portion of a cooling airflow that is generated by the rotation of the fans 5 and moves axially relative to the rotor 7 flows through cooling passages formed by the gaps 31 and cools the magnetic bodies 30 and the permanent magnets 20, suppressing temperature increases in the magnetic bodies 30 and the permanent magnets 20. Because of this, the generated torque and generated power can be further improved because the temperature gradient of the magnetic flux from the permanent magnets 20 is negative, the magnetic flux is strengthened by the temperature reduction, and irreversible demagnetization of the permanent magnets 20 due to temperature increases is also prevented.

The overall temperature of the rotor 7 is also reduced, enabling heat damage to resin materials used in a bobbin of the field winding 14 to be prevented.

Embodiment 3

Figure 6:
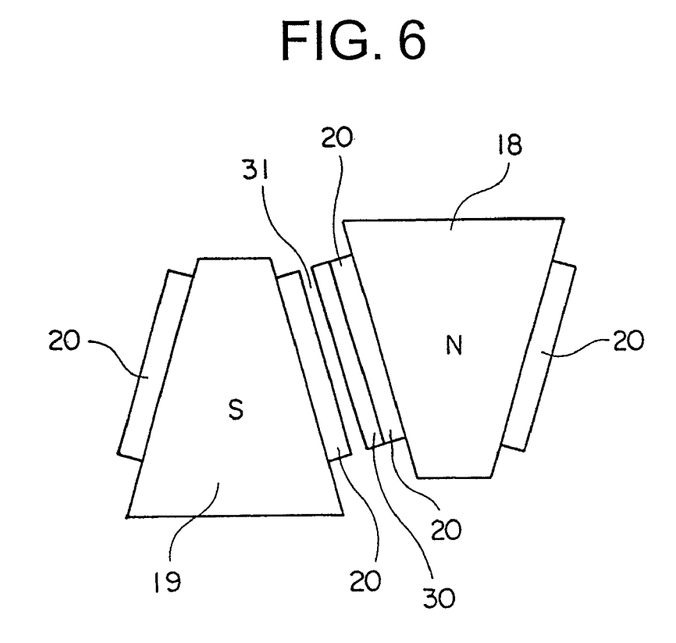
FIG. 6 is a diagram showing part of an automotive alternating-current generator-motor according to Embodiment 3 of the present invention when viewed from a radial direction.

FIG. 6 is a diagram showing part of a generator-motor according to Embodiment 3 of the present invention when viewed from a radial direction, wherein a magnetic body 30 is bonded to a side surface of a first permanent magnet 20 of a pair of first and second permanent magnets 20 that face each other.

The rest of the configuration is similar to the generator-motor according to Embodiment 1, and this embodiment has effects similar to those of the generator-motor according to Embodiment 2.

Embodiment 4

Figure 7:
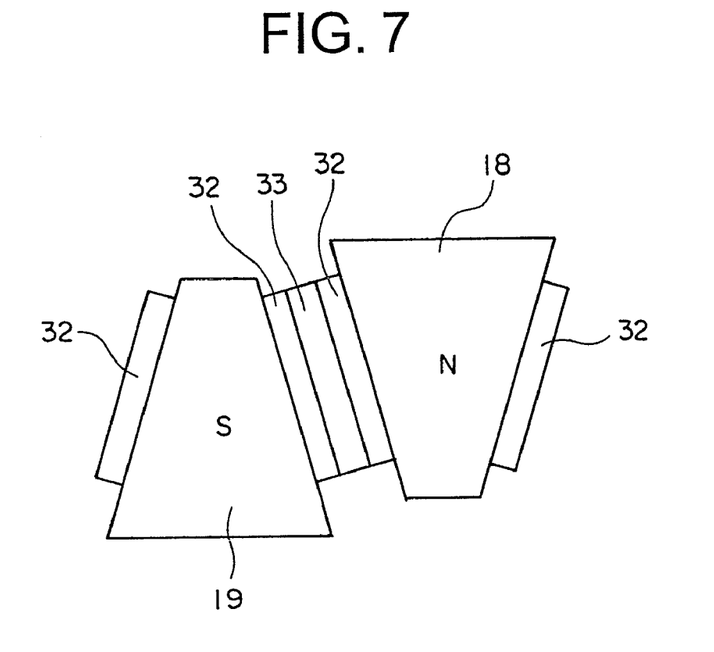
FIG. 7 is a diagram showing part of an automotive alternating-current generator-motor according to Embodiment 4 of the present invention when viewed from a radial direction.

FIG. 7 is a diagram showing part of an automotive alternating-current generator-motor according to Embodiment 4 of the present invention when viewed from a radial direction, wherein a permanent magnet 33 is disposed between adjacent claw-shaped magnetic poles 18 and 19. Magnetic bodies 32 are respectively disposed on first and second circumferential side surfaces of the permanent magnet 33.

The rest of the configuration is similar to the generator-motor according to Embodiment 1, and this embodiment has effects similar to those of the generator-motor according to Embodiment 1.

Embodiment 5

Figure 8:
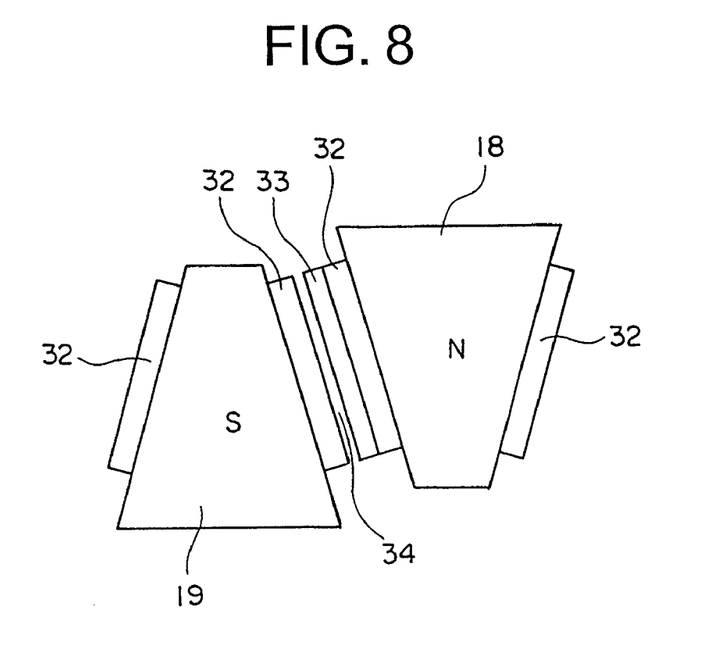
FIG. 8 is a diagram showing part of an automotive alternating-current generator-motor according to Embodiment 5 of the present invention when viewed from a radial direction.

FIG. 8 is a diagram showing part of an automotive alternating-current generator-motor according to Embodiment 5 of the present invention when viewed from a radial direction, wherein a permanent magnet 33 is bonded to a first magnetic body 32 of a pair of first and second magnetic bodies 32, and a gap 34 that extends axially relative to the rotor 7 is disposed between the permanent magnet 33 and the second magnetic body 32.

The rest of the configuration is similar to the generator-motor according to Embodiment 4, and this embodiment has effects similar to those of the generator-motor according to Embodiment 2.

Embodiment 6

Figure 9:
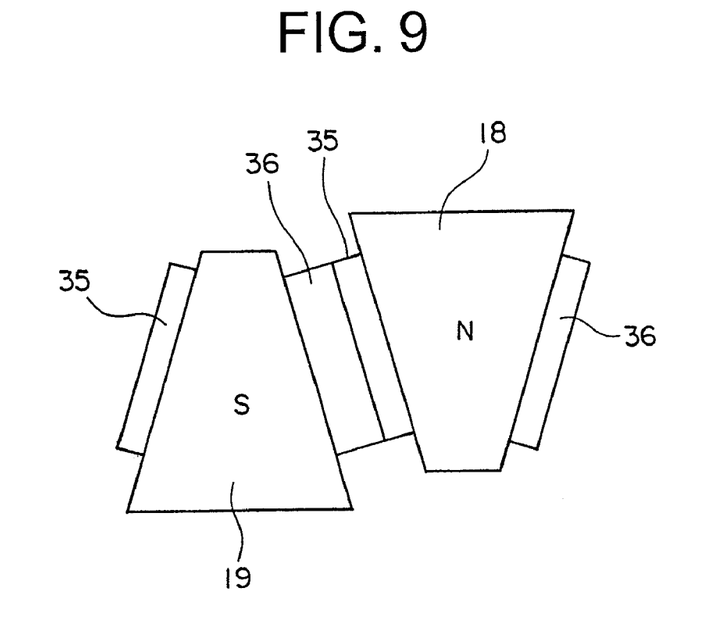
FIG. 9 is a diagram showing part of an automotive alternating-current generator-motor according to Embodiment 6 of the present invention when viewed from a radial direction.
Figure 10:
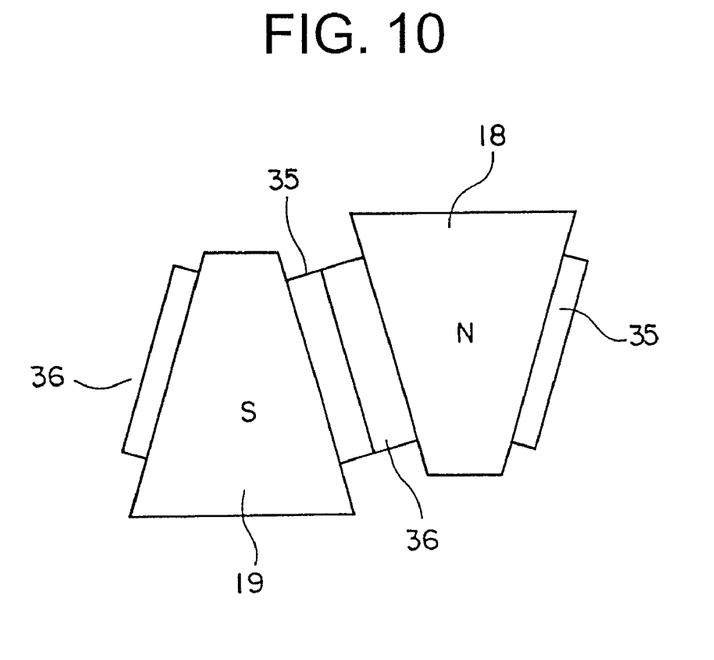
FIG. 10 is a diagram showing part of another example of an automotive alternating-current generator-motor according to Embodiment 6 of the present invention when viewed from a radial direction.

FIGS. 9 and 10 are diagrams showing parts of generator-motors according to Embodiment 6 of the present invention when viewed from a radial direction, wherein a permanent magnet 35 and a magnetic body 36 are interposed between adjacent claw-shaped magnetic poles 18 and 19 by disposing the permanent magnet 35 on a first side surface of claw-shaped magnetic poles 18 and 19 and disposing the magnetic body 36 on a second side surface.

The rest of the configuration is similar to the generator-motor according to Embodiment 1, and this embodiment has effects similar to those of the generator-motor according to Embodiment 1.

Embodiment 7

Figure 11:
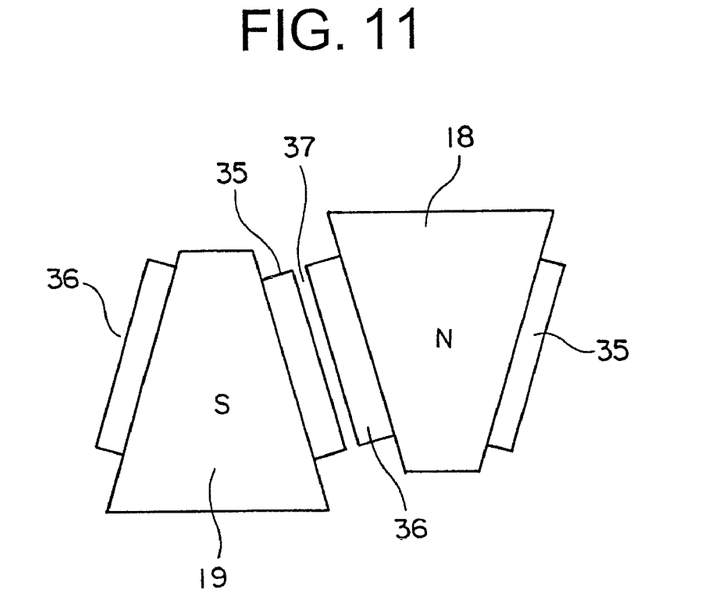
FIG. 11 is a diagram showing part of an automotive alternating-current generator-motor according to Embodiment 7 of the present invention when viewed from a radial direction.

FIG. 11 is a diagram showing part of a generator-motor according to Embodiment 7 of the present invention when viewed from a radial direction, wherein a gap 37 that extends axially relative to the rotor 7 is disposed between a permanent magnet 35 and a magnetic body 36.

The rest of the configuration is similar to the generator-motor according to Embodiment 6, and this embodiment has effects similar to those of the generator-motor according to Embodiment 2.

Embodiment 8

Figure 12:
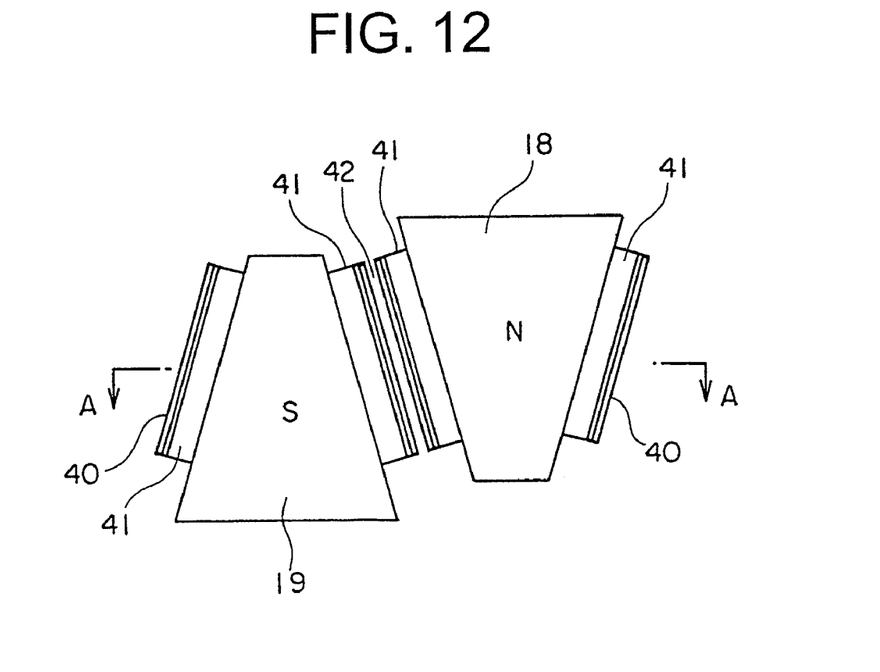
FIG. 12 is a diagram showing part of an automotive alternating-current generator-motor according to Embodiment 8 of the present invention when viewed from a radial direction.
Figure 13:
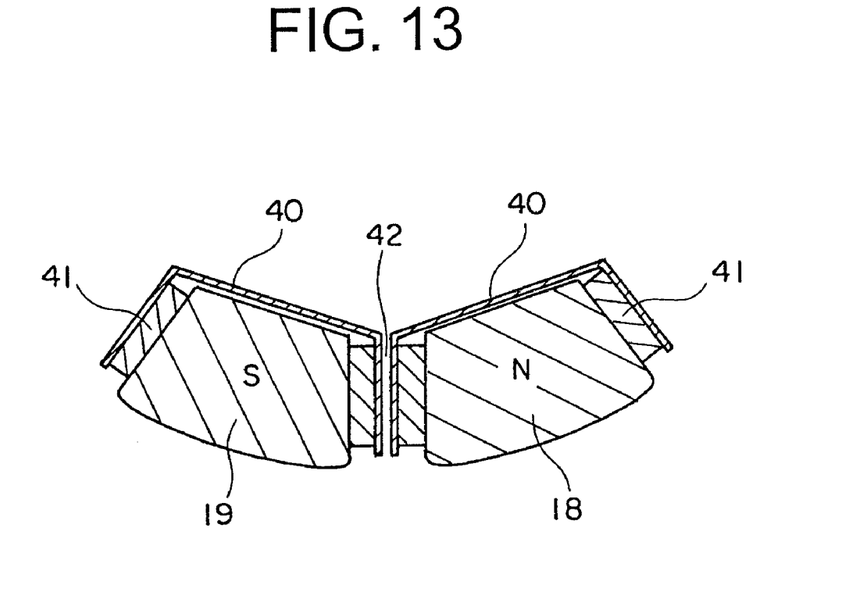
FIG. 13 is a cross section taken along line A-A in FIG. 12 viewed in the direction of the arrows.

FIG. 12 is a diagram showing part of a generator-motor according to Embodiment 8 of the present invention when viewed from a radial direction, and FIG. 13 is a cross section taken along line A-A in FIG. 12 viewed in the direction of the arrows.

In this embodiment, permanent magnets 41 are disposed on first and second circumferential sides of each of the claw-shaped magnetic poles 18 and 19. These permanent magnets 41 are held by holding members 40 that are constituted by a magnetic body having an angular C-shaped cross section that also surround the claw-shaped magnetic poles 18 and 19. A gap 42 is disposed between adjacent holding members 40.

The rest of the configuration is similar to the generator-motor according to Embodiment 2, and this embodiment has effects similar to those of the generator-motor according to Embodiment 2.

Embodiment 9

Figure 14:
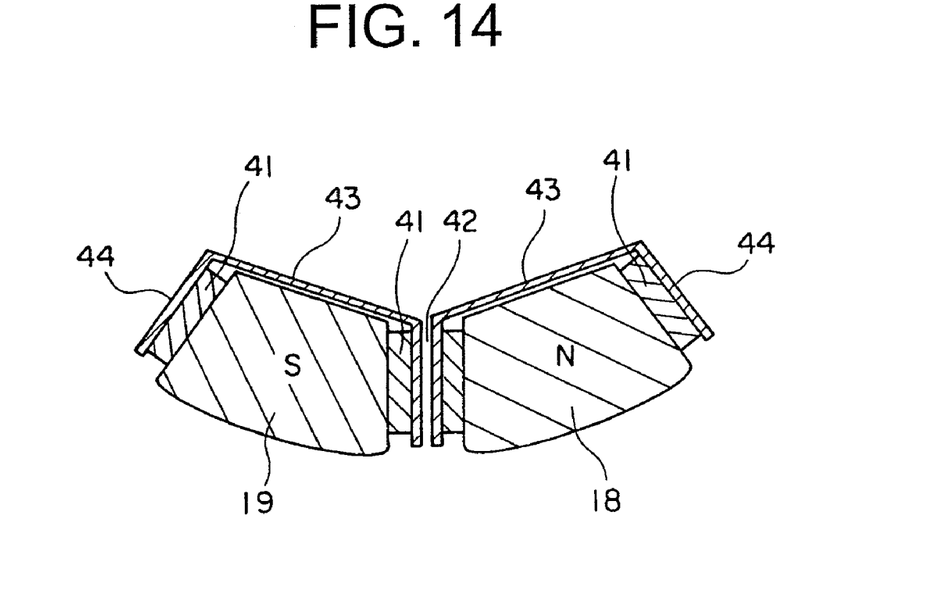
FIG. 14 is a partial cross section of an automotive alternating-current generator-motor according to Embodiment 9 of the present invention.

FIG. 14 is a partial cross section of a generator-motor according to Embodiment 9 of the present invention.

In this embodiment, permanent magnets 41 are disposed on first and second circumferential sides of each of the claw-shaped magnetic poles 18 and 19. These permanent magnets 41 are held by holding members 43 that have an angular C-shaped cross section that also surround the claw-shaped magnetic poles 18 and 19. A gap 42 is disposed between adjacent holding members 43. Contacting portions 44 of the holding members 43 that are placed in contact with the permanent magnets 41 are constituted by magnetic bodies.

The rest of the configuration is similar to the generator-motor according to Embodiment 8, and this embodiment has effects similar to those of the generator-motor according to Embodiment 8.

Embodiment 10

Figure 15:
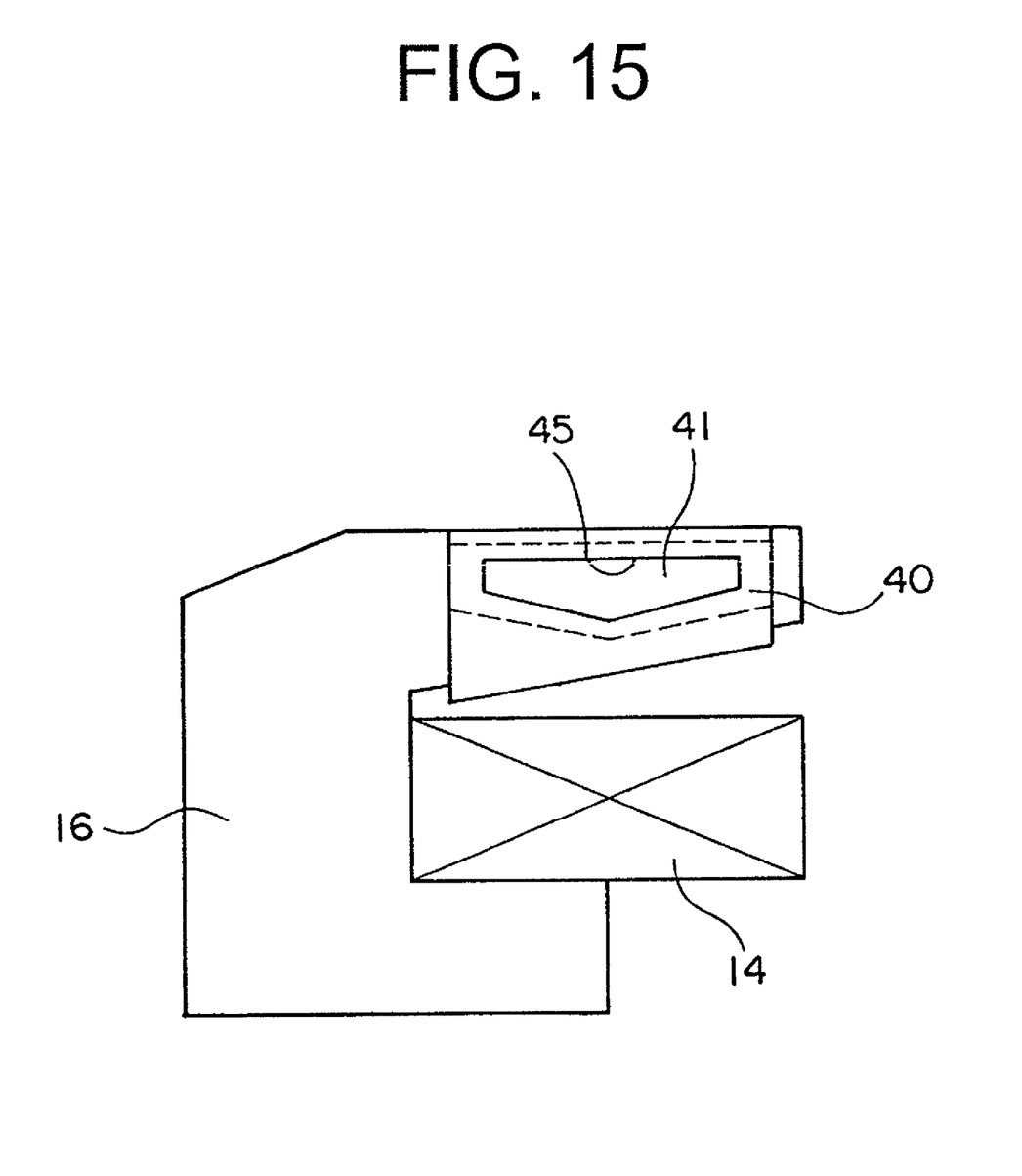
FIG. 15 is a partial cross section of an automotive alternating-current generator-motor according to Embodiment 10 of the present invention.

FIG. 15 is a partial cross section of a generator-motor according to Embodiment 10 of the present invention.

In this embodiment, apertures 45 are formed on portions of holding members 40 having an angular C-shaped cross section that come into contact with the circumferential side surfaces of the permanent magnets 41.

The rest of the configuration is similar to the generator-motor according to Embodiment 8, and in a similar manner to the generator-motor according to Embodiment 8, the generated torque is improved because holding members 40 that are constituted by magnetic bodies are disposed on the side surfaces of the permanent magnets 41, and the permanent magnets 41 are also cooled directly because cooling air that passes between the claw-shaped magnetic poles 18 and 19 contacts the permanent magnets 41 directly through the apertures 45, further improving generated torque.

Moreover, in each of the above embodiments, an automotive generator-motor has been explained as an example of a dynamoelectric machine, but of course the present invention is not limited to automotive generator-motors, and can also be applied to automotive alternators as dynamoelectric machines. Furthermore, the present invention is not limited to automotive vehicles, and for example, can also be applied to outboard motors, and it can also be applied to electric motors.

What is claimed is:

1. An alternating-current dynamoelectric machine comprising:
   a stator including:
      a stator core in which slots that extend in an axial direction are formed on an inner side; and
      a stator winding that is mounted to said stator core by winding conducting wires into said slots; and
   a rotatable rotor including:
      a field winding that is disposed inside said stator;
      a rotor core constituted by a first pole core and a second pole core that each have claw-shaped magnetic poles that are disposed so as to cover said field winding and that alternately intermesh with each other; and
      a permanent magnet that is disposed between two facing side surfaces of adjacent claw-shaped magnetic poles and that has a magnetic field that is oriented so as to reduce leakage of magnetic flux between said claw-shaped magnetic poles, said alternating-current dynamoelectric machine being characterized in that first and second magnetic bodies are respectively disposed on first and second circumferential side surfaces of said permanent magnet,
   wherein each of the first and second magnetic bodies has hexahedron shape, and
   wherein each of the first and second magnetic bodies are exposed when viewed from an outside in a radial direction.

2. An alternating-current dynamoelectric machine according to claim 1, wherein said permanent magnet is disposed on said second magnetic body such that a gap forms between said permanent magnet and said first magnetic body and the gap extends parallel to at least one of said first and second circumferential side surfaces.

3. An alternating-current dynamoelectric machine according to claim 1, wherein the first and second magnetic bodies respectively directly abut the first and second circumferential side surfaces of same permanent magnet and wherein the first and second magnetic bodies are separate elements.

4. An alternating-current dynamoelectric machine according to claim 3, wherein entire side surface of the at least one of the first and second magnetic bodies abuts the at least one of the claw-shaped magnetic poles.

5. An alternating-current dynamoelectric machine according to claim 1, wherein the first and second magnetic bodies are at least as wide as the permanent magnet disposed in between.

6. An alternating-current dynamoelectric machine comprising:
   a stator including:
      a stator core in which slots that extend in an axial direction are formed on an inner side; and
      a stator winding that is mounted to said stator core by winding conducting wires into said slots; and
   a rotatable rotor including:
      a field winding that is disposed inside said stator;
      a rotor core constituted by a first pole core and a second pole core that each have claw-shaped magnetic poles that are disposed so as to cover said field winding and that alternately intermesh with each other; and
      a permanent magnet that is disposed between facing first and second side surfaces of adjacent claw-shaped magnetic poles and that has a magnetic field that is oriented so as to reduce leakage of magnetic flux between said claw-shaped magnetic poles,
   wherein said permanent magnet is directly bonded to said first side surface without a magnetic body therein between and a magnetic body is directly bonded to said second side surface without the permanent magnet therein between.

7. An alternating-current dynamoelectric machine comprising:
   a stator including:
      a stator core in which slots that extend in an axial direction are formed on an inner side; and
      a stator winding that is mounted to said stator core by winding conducting wires into said slots; and
   a rotatable rotor including:
      a field winding that is disposed inside said stator;
      a rotor core constituted by a first pole core and a second pole core that each have claw-shaped magnetic poles that are disposed so as to cover said field winding and that alternately intermesh with each other; and
      a permanent magnet that is disposed between facing first and second side surfaces of adjacent claw-shaped magnetic poles and that has a magnetic field that is oriented so as to reduce leakage of magnetic flux between said claw-shaped magnetic poles,
   wherein said permanent magnet is directly bonded to said first side surface and a magnetic body is directly bonded to said second side surface, and
   wherein a gap is disposed parallel to at least one of said side surfaces between said permanent magnet and said magnetic body.

* * * * *